H. PITCHER.
Universal Joints.

No. 148,382. Patented March 10, 1874.

WITNESSES:

INVENTOR:
BY
ATTORNEYS.

UNITED STATES PATENT OFFICE.

HIRAM PITCHER, OF FOND DU LAC, WISCONSIN.

IMPROVEMENT IN UNIVERSAL JOINTS.

Specification forming part of Letters Patent No. 148,382, dated March 10, 1874; application filed January 31, 1874.

*To all whom it may concern:*

Be it known that I, HIRAM PITCHER, of Fond du Lac, in the county of Fond du Lac and State of Wisconsin, have invented a new and useful Improvement in Universal Joints, of which the following is a specification:

This invention relates to apparatus used for conveying power and motion by means of rods from the motor to the machinery driven; and it consists in a universal joint formed of a cup-piece and a head-piece, with intervening rollers, the construction and arrangement being as hereinafter described.

Figure 1:
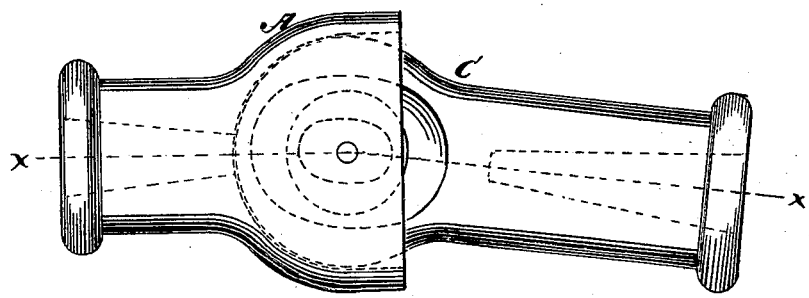
Figure 2:
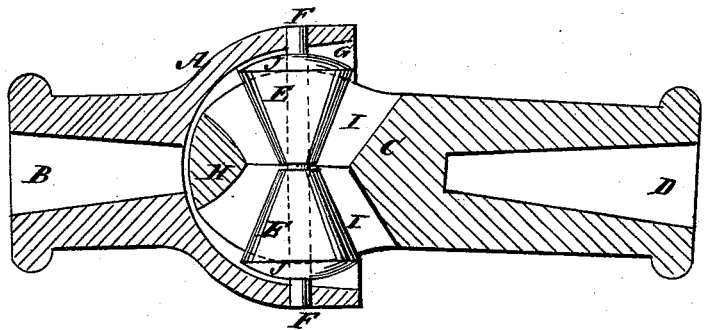

In the accompanying drawing, Figure 1 is a side view, the interior construction being indicated by dotted lines. Fig. 2 is a longitudinal section of Fig. 1, taken on the line *x x*.

Similar letters of reference indicate corresponding parts.

This joint consists of the cup-piece A, which is attached, by means of the socket B, to the end of one of the rods to be coupled, and the head-piece C, which is attached to the end of the other rod to be coupled by means of the socket D, and the two intervening rollers E E, which are revolved on the bolt or pin F, which passes through the cup. The cup-piece A has a hemispherical cavity, G, which contains the rollers and supports the pin F, as seen in Fig. 2. The head-piece C is globular at the end to correspond in some measure with the cavity G. The globular head H has an opening, I, the sides of which incline inward to the center, leaving the inner sides of the opening V-shaped, as seen in Fig. 2, and of oval form at the center of the head, as indicated in dotted lines in Fig. 1. The rolls E E are truncated cones, which revolve freely on the pin or bolt F, from friction caused by the head-piece. Plenty of play is given the head-piece in the cup to allow the rods to be placed at almost any desired angle with each other.

It will be seen that the rolls pass through the opening I in the head-piece, and that the sides of the opening correspond with the form of the rolls.

In this coupling-joint there is no tensile strain. The bolt F receives the strain as the coupled rod revolves. The outer ends of the rollers are made conical, as seen at J J, to prevent undue friction. The rollers revolve independently of each other as they are touched by the head, and this allows the two coupling-rods to be placed at an angle with each other without increasing the friction.

In the ordinary coupling-rod (as a whole) it is necessary, in order to avoid friction, to place it on a line. With this joint it is immaterial whether the rod is on a straight line, or whether it forms one or more angles. Any desired number of these joints may be used, according to the distance of the machine from the motor.

The purpose for which this joint is more especially designed is for connecting horse-powers with thrashing-machines; but it, of course, is not confined to that particular purpose.

Having thus described my invention, I claim as new and desire to secure by Letters Patent—

A shaft-coupling composed of a ball-and-socket joint, combined with conical rolls E E and pin F, as set forth.

HIRAM PITCHER.

Witnesses:
HENRY F. ROSE,
B. F. KELSEY.